United States Patent
Currier et al.

(10) Patent No.: US 6,441,304 B1
(45) Date of Patent: Aug. 27, 2002

(54) ELECTRICAL OUTLET ASSEMBLY

(75) Inventors: Peter Currier; John Chapdelaine, both of Torrington; Thomas Russo, Bristol, all of CT (US)

(73) Assignee: The Wiremold Company, West Hartford, CT (US)

( * ) Notice: Subject to any disclaimer, the term of this patent is extended or adjusted under 35 U.S.C. 154(b) by 0 days.

(21) Appl. No.: 09/566,249

(22) Filed: May 5, 2000

(51) Int. Cl.$^7$ ................................................ H01H 9/02
(52) U.S. Cl. ............................ 174/53; 174/50; 174/54; 220/3.2
(58) Field of Search .............................. 174/53, 50, 54, 174/55, 57, 58, 66, 48; 220/3.2, 3.3, 3.8, 4.02, 241; 439/535

(56) References Cited

U.S. PATENT DOCUMENTS

| | | | |
|---|---|---|---|
| 1,999,194 A | | 4/1935 | Hubbell, Jr. |
| 2,934,590 A | | 4/1960 | Thompson et al. |
| 3,437,737 A | * | 4/1969 | Wagner ........................ 174/66 |
| 3,662,085 A | | 5/1972 | Robinson et al. |
| 3,885,852 A | | 5/1975 | Grove |
| 3,928,716 A | | 12/1975 | Marrero |
| 4,485,282 A | | 11/1984 | Lee |
| 4,500,746 A | | 2/1985 | Meehan |
| 4,733,330 A | * | 3/1988 | Tanaka et al. ................ 174/66 |
| 5,223,673 A | | 6/1993 | Mason |
| 5,477,010 A | * | 12/1995 | Buckshaw et al. ............ 174/67 |
| 5,518,132 A | | 5/1996 | Chen |
| 5,594,208 A | * | 1/1997 | Cancellieri et al. ........... 174/58 |
| 5,667,059 A | * | 9/1997 | Lee .............................. 174/53 |
| 5,727,958 A | * | 3/1998 | Chen ............................ 174/67 |
| 5,744,750 A | * | 4/1998 | Almond ....................... 174/66 |
| 5,783,777 A | * | 7/1998 | Kruse et al. .................. 174/66 |
| 5,863,016 A | | 1/1999 | Makwinski et al. |
| 5,942,724 A | * | 8/1999 | Russo et al. .................. 174/48 |

* cited by examiner

Primary Examiner—Chau N. Nguyen
Assistant Examiner—Angel R. Estrada
(74) Attorney, Agent, or Firm—McCormick, Paulding & Huber LLP

(57) ABSTRACT

A device bracket, or outlet box assembly, has openings for receiving projecting portions of an electrical outlet device, or other socket defining device, such that one of these projecting portions can be hooked in place by the installer, so that the other projecting portion can be pushed into place in a one handed installation step. The said other projecting portion being resiliently deformable so as to latch into place.

7 Claims, 3 Drawing Sheets

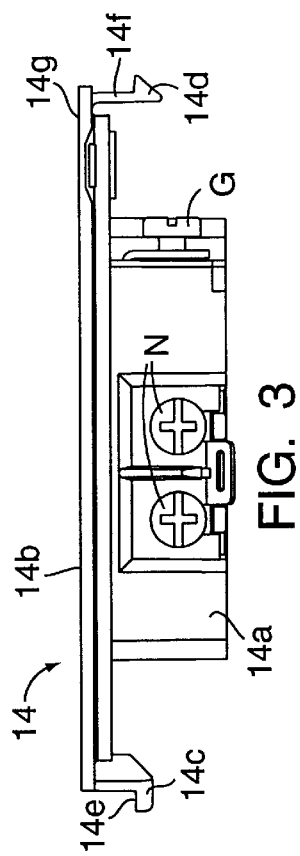
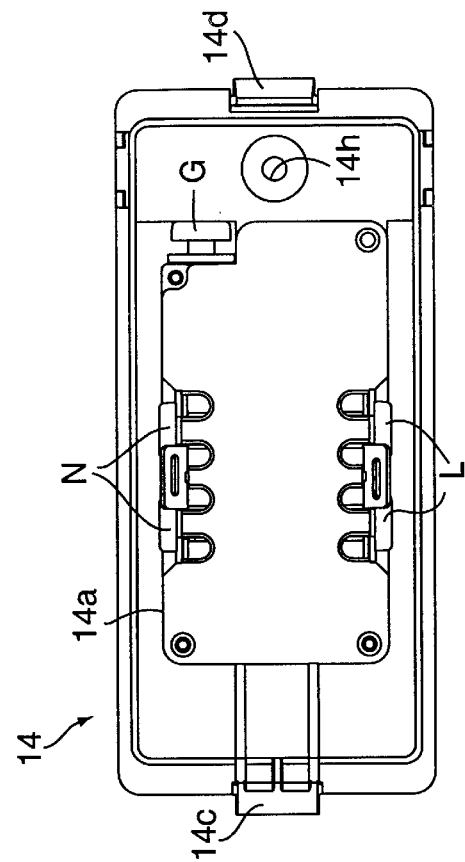
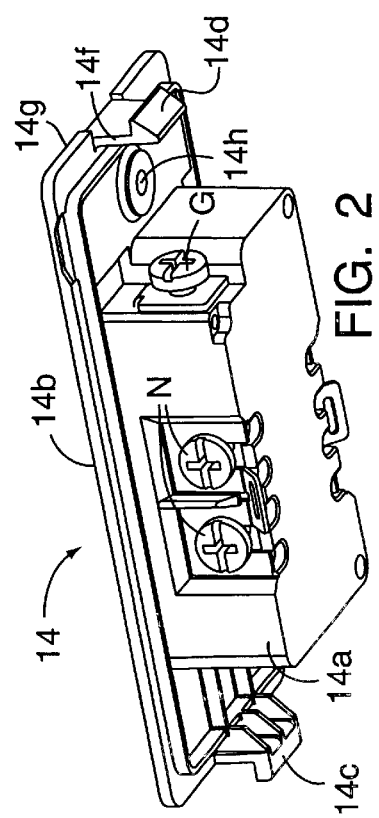
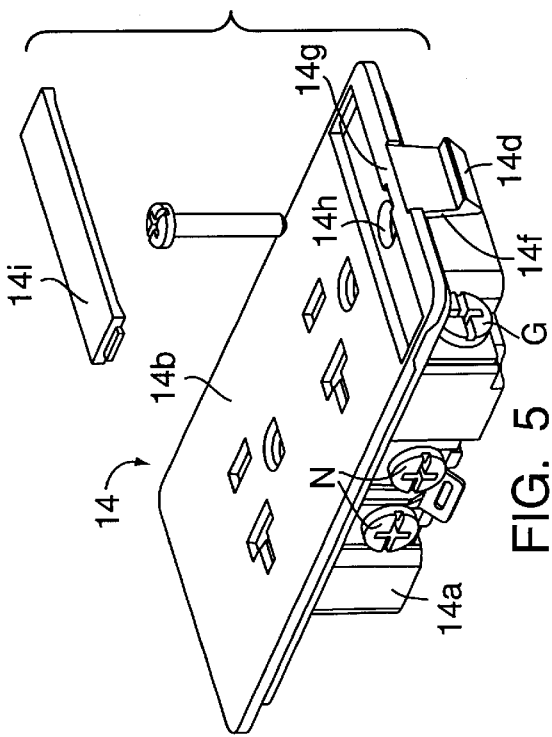

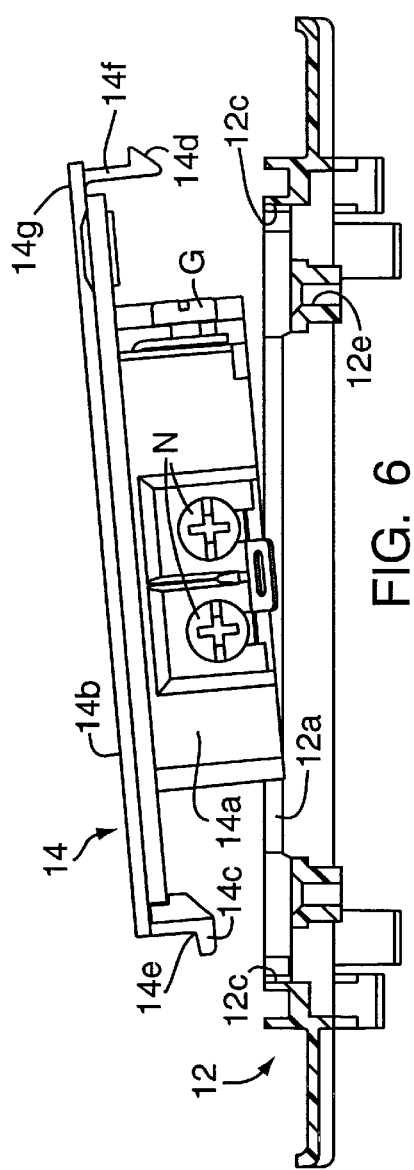
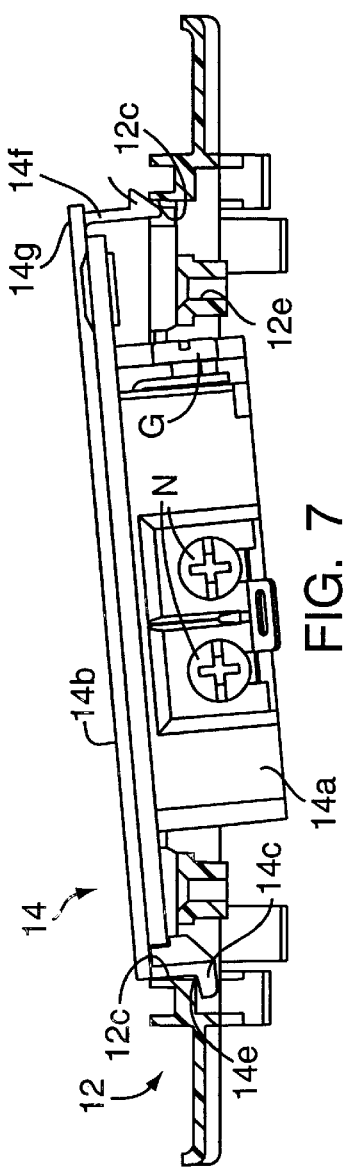
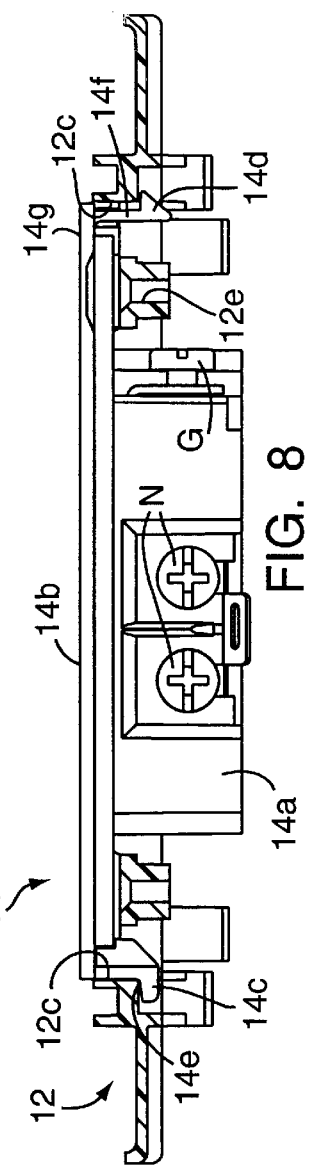
FIG. 6
FIG. 7
FIG. 8

US 6,441,304 B1

ELECTRICAL OUTLET ASSEMBLY

BACKGROUND OF THE INVENTION

This invention relates generally to the installation of outlet devices in outlet boxes or device brackets as components of an electrical distribution system. More particularly, the invention relates to a unique assembly of an outlet device and device bracket that will allow the installer to use one hand in assembling these components in the field.

DESCRIPTION OF THE PRIOR ART

Outlet devices have been provided in outlet boxes or device brackets in the past usually be providing two threaded fasteners one at each end of the outlet device, and requiring the installer to use two hands in the process of threading the screws in place, that is threading the screws into the outlet box or device bracket.

An improvement to this prior art technology has been to provide for snapping the outlet device into a recess provided for it in the device bracket or outlet box, so that opposed projecting portions fit into recess openings. Here again, two hands have generally been required to properly align these components in the process of installation.

Such prior art snap in installation techniques are shown in the following U.S. Patent. U.S. Pat. No. 3,662,085, Robinson et al. shows ratchet-type teeth at opposed ends of the outlet device that are in turn received in interlocking relationship inside the bracket that supports the outlet plug.

A similar approach is shown in U.S. Pat. No. 5,223,673, to Mason where internal serrations are provided within the outlet box that cooperate with serrations provided on the edges of the outlet device for anchoring the components together.

Other examples of such snap in outlet devices can be seen in U.S. Pat. No. 4,500,746 issued to Meehan, Feb. 19, 1985. Here again, accurate alignment must be provided between the components in order to assemble them, so as to require the use of two hands in order to accomplish this task in the field.

Still another prior art approach utilizes threaded fasteners, generally provided in the outlet plug or device, for insertion into openings in the outlet box cover. U.S. Pat. No. 5,594, 205 issued to Rogers et al. Jan. 14, 1997, shows such an arrangement for a surface mounted outlet box. The outlet box cover is provided with openings of unique shape to slidably receive the threaded fasteners normally provided on the ends of the outlet plug. The '205 patent shows the fasteners slidably received in the openings of the outlet so anchored in place as to require unthreading for removal.

The general purpose of the present invention is to provide an improvement over the above-mentioned prior art where an installer can use one hand to place the electrical device in an outlet box or device bracket, by hooking one end of the outlet device in place and snapping the opposite end into position with a minimum of aligning required between the two components.

SUMMARY OF THE INVENTION

In accordance with the present invention, and in the environment of an electrical distribution system having wires that are accessed at predetermined locations for installation of electrical devices, the electrical devices and device brackets are preferably of molded polymeric material. The electrical device has a housing defining at least one socket defining portion in a front face thereof, and means is provided for coupling the wires to this socket rearwardly of the front face of the outlet device.

The device bracket is provided with a relieved cavity for receiving the outlet device, and the device bracket has opposed keeper openings adjacent the ends of the cavity.

The housing of the device further includes rearwardly projecting portions provided at opposite ends of the socket defining portion thereof, and one of these rearwardly projecting portions has a rigid hook shape adapted to fit into one of the opposed keeper openings in the device bracket. The other of the projecting portions is resiliently deformable and defines an abutment or offset end portion which is adapted to be forced into the other of the opposed keeper openings in the device bracket.

BRIEF DESCRIPTION OF THE DRAWINGS

FIG. 2 is a perspective view of the underside of the outlet device or plug illustrated in FIG. 1.

FIG. 3 is an elevational view of the outlet device of FIG. 2.

FIG. 4 is a rear view of the outlet device illustrated in FIGS. 2 and 3.

FIG. 5 is a perspective view of the outlet device showing the various components in exploded relationship.

FIGS. 6, 7 and 8 show in side elevation the method of assembly provided for with this invention.

DETAILED DESCRIPTION OF THE PREFERRED EMBODIMENT

Figure 1:
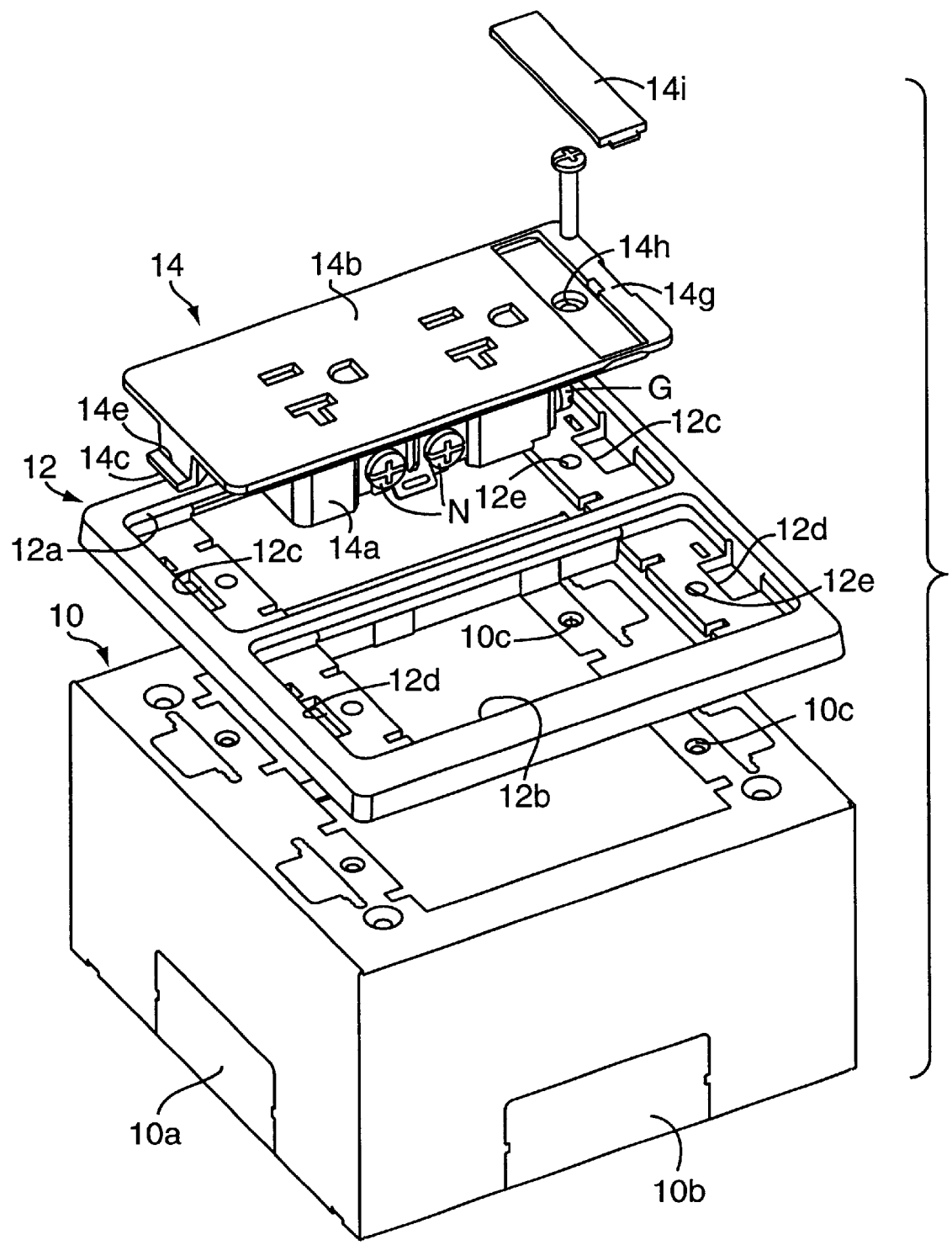
FIG. 1 is an exploded perspective view illustrating the various components of the present invention together with the environment in which they reside.

FIG. 1 shows an outlet box 10 which is adapted to be fitted with a polymeric double gang device bracket 12 suitable for receiving either a data communications outlet or an outlet plug such as that depicted at 14 in FIG. 1. It will apparent that the outlet box 10 might itself define the cavities or recesses that are adapted to receive the device 14, and the present invention utilizes the term device bracket to identify either a bracket type component such as that illustrated at 12 in FIG. 1, or a junction box similar to that shown at 10 in FIG. 1 but adapted to itself receive outlet devices such as that illustrated at 14 in FIG. 1. Thus, a device bracket need not be a separate such as that depicted at 12 in FIG. 1.

The components of FIG. 1 are intended for use in a typical electrical distribution system, and more particularly for a system of the surface mounted raceway type. The box 10 can be seen to have knock out openings 10a and 10b which are adapted to accommodate raceway (not shown) of the type adapted to carry wiring to or from the box 10 in accordance with conventional electrical distribution systems of this type. The present invention seeks to simplify the manner in which an outlet device such as that illustrated at 14 can be assembled with such an outlet box. As shown, the outlet box is provided with a device bracket 12 that can be preassembled with the box 10, or as mentioned previously can be molded integrally with the box all in accordance with conventional practice.

The device bracket 12 includes openings 12a and 12b which provide relieved cavities for receiving the outlet device 14 and other electrical devices of this type. For example, other such electrical devices might comprise electrical switches, data communication socket configurations, and telephone jacks or the like.

Still with reference to the device bracket 12 the relieved cavities 12a and 12b further define opposed keeper openings 12c and 12d which are disposed on the end portions of these cavities 12a and 12b respectively.

Turning next to a detailed description of FIGS. 2, 3, 4 and 5, the electrical outlet plug or device 14 can be seen to comprise a molded polymeric housing 14a having socket defining portions in a front face 14b that will accommodate a conventional electrical outlet plug. As shown two such socket defining portions are provided in the duplex outlet plug shown.

The outlet device 14 includes conventional internal means for coupling the wires (not shown) to these socket defining portions, and terminal screws indicated generally at L, N and G are provided for convenience in connecting these wires to such means within the housing 14a.

In accordance with the present invention the electrical device 14 has rearwardly projecting portions 14c and 14d arranged at opposite ends of the socket defining portion of the device, and the first mentioned such rearwardly projecting portion 14c is of relatively rigid configuration and defines a hook 14e that can be inserted into one of the opposed keeper openings 12c or 12d in the device bracket 12 during the process of assembling the electrical device with the bracket 12.

At the opposite end of the electrical device 14 a second rearwardly projecting portion 14d is formed with a reduced cross-section, as indicated at 14f, so as to be resiliently deformable, and consequently capable of entering the other or the second of the opposed keeper openings 12c or 12d in the device bracket 12 as a result of pushing or applying pressure to the end 14g of the electrical device 14 at assembly.

In summary, the one end of the electrical device 14 associated with the rigid hook 14c is adapted to being first received in one of the keeper openings provided for this purpose in the device bracket, and the opposite or second end 14g of the electrical device is fitted with a resilient leg or wing portion 14g that must be forcibly received in its associated keeper opening at the opposite end of the device bracket 12. As an added measure of security a rapid insertion or conventional threaded fastener can be inserted into an opening 14h at the end 14g of the device 14, and may also be received in a corresponding opening 10c or 12e in the box 10, as an added measure of security or tamper resistance for anchoring the electrical device 14 in place. The opening 14h can be concealed by a cover 14i.

Other variations of the present invention will occur to those skilled in the art. For example, the outlet box 10 is not an essential element of the present invention since all that is required is a device bracket such as that illustrated at 12 in order to receive an electrical device of the type shown for example at 14 in the drawings. A particularly appropriate application of the present invention can be found in a surface mounted raceway system of the type employing device brackets within the raceway itself. Such an environment does not require junction boxes. Several device brackets would be provided in such a raceway, and is an important feature of the present invention that such device brackets have the attributes of the trim ring device bracket 12 shown in the drawings, where relieved cavities are provided to receive the electrical devices, and keeper openings are provided at the opposed ends of these cavities for receiving either the hooked end portion of the device or receiving the rearwardly projecting resilient wing portion at the other end of the devices.

In light of the above, it is therefore understood that within the scope of the appended claims, the invention may be practiced otherwise than as specifically described

We claim:

1. In an electrical distribution system having wires that are accessed at predetermined locations for installation of electrical devices, and the distribution system further including device brackets for the devices, the improvement to such devices and brackets comprising:

a molded polymeric device housing having at least one socket defining portion in a front face thereof, and having means for coupling the wires to said socket defining portion rearwardly of said front face, a device bracket having a relieved cavity for receiving said device, said device bracket having opposed keeper openings, and said device housing having rearwardly projecting portions at opposite ends of said socket defining portion of said device housing, one of said of rearwardly projecting portions being rigid and adapted to fit into one of said opposed keeper openings, the other of said projecting portions being resiliently deformable and defining an abutment end portion.

2. The combination of claim 1 wherein said keeper openings are configured so as to receive either one or the other of said rearwardly projecting portions.

3. The combination of claim 1 wherein said resiliently deformable projecting portion has a width which is approximately equal to the width of said rigid projecting portion, said rigid projecting portion having a hook shaped end portion and a thickened portion to prevent flexing thereof, said resiliently deformable projecting portion having a relatively thin thickness so as to allow flexing thereof during assembly with said device bracket as aforesaid.

4. The combination of claim 1 further comprising a threaded fastener adjacent said other of said projecting portions, and a threaded opening in an outlet box housing of the type which is adapted to receive a device bracket.

5. The combination of claim 4 wherein no threaded fastener is provided adjacent said one projecting portion.

6. The combination of claim 1 wherein said molded polymeric device housing contains electrical connections and outlet plug openings so that no separate faceplate is required as with a conventional outlet plug device.

7. The combination of claim 1 further comprising an outlet box for receiving said device bracket, and a single fastener provided through an opening in said device bracket, said fastener extending through an opening in said device housing and being threadably received in said outlet box.

* * * * *